United States Patent [19]

Almeida

[11] Patent Number: 4,491,090

[45] Date of Patent: Jan. 1, 1985

[54] ANIMAL COLLAR

[76] Inventor: Anthony Almeida, 167 Westminster Ave., Buffalo, N.Y. 14215

[21] Appl. No.: 609,716

[22] Filed: May 14, 1984

[51] Int. Cl.³ .............................................. A01K 27/00
[52] U.S. Cl. .................................................. 119/106
[58] Field of Search ........................... 119/106, 109, 96

[56] References Cited

U.S. PATENT DOCUMENTS 870,784 11/1907 Huff ..................................... 119/106

FOREIGN PATENT DOCUMENTS 2449941 4/1976 Fed. Rep. of Germany ...... 119/106

Primary Examiner—Jay N. Eskovitz
Attorney, Agent, or Firm—Joseph P. Gastel

[57] ABSTRACT

An animal collar having inner and outer elongated bands of flexible leather-type material sandwiching an elongated thin metal band therebetween, the thin metal band being turned over on itself at the end of the collar to provide a loop for receiving a D-ring, a loop-like buckle spaced inwardly on the collar from the D-ring and lying between the inner and outer flexible leather-like bands, and the metal band overlying the portion of the loop-like buckle secured to the collar and providing rigidity to the collar between the D-ring and the buckle, a plurality of metal eyelets at the tongue end of the collar for receiving the tongue of the buckle, with the inner elongated leather-type band overlying the eyelets.

9 Claims, 6 Drawing Figures

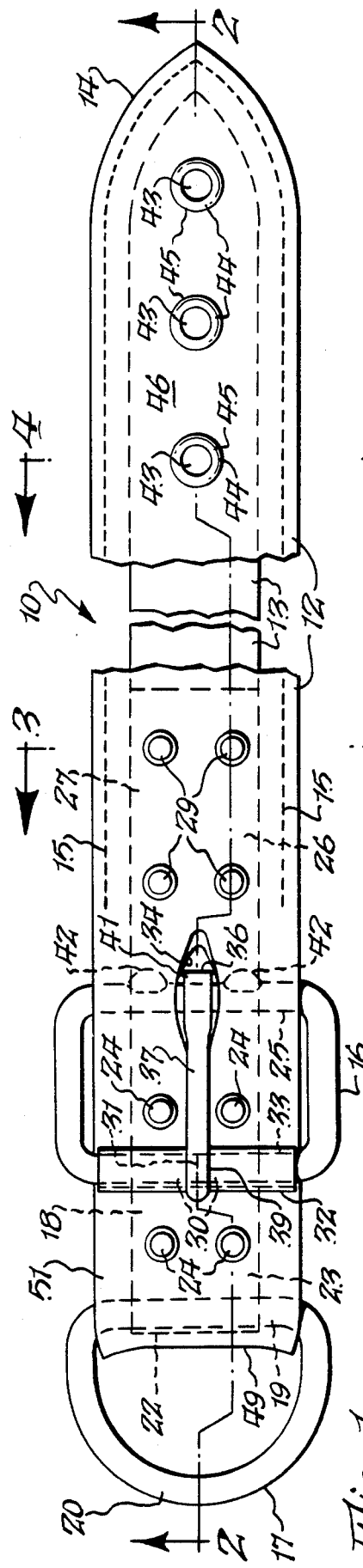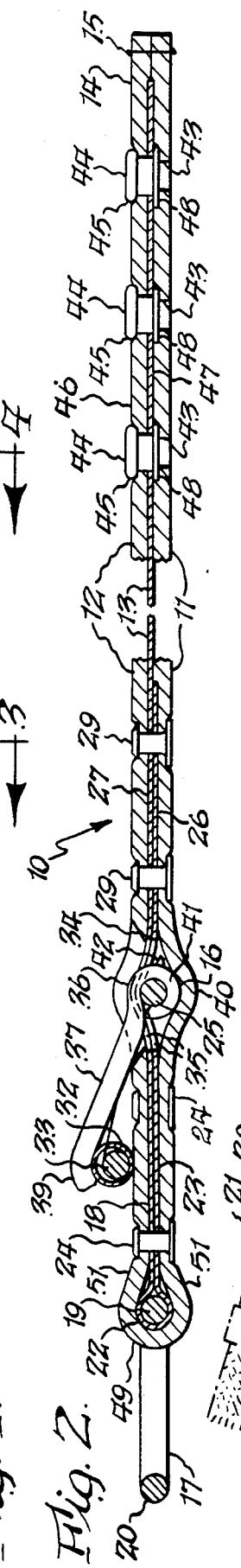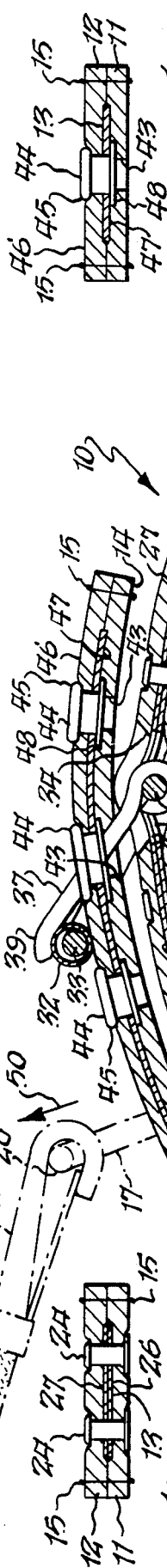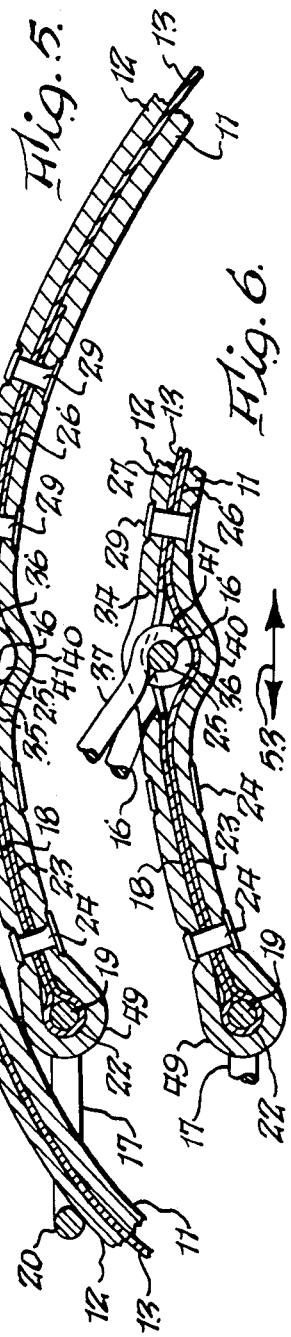

ANIMAL COLLAR

BACKGROUND OF THE INVENTION

The present invention relates to an improved animal collar of the type which can be used on large dogs, cattle, bulls and the like.

By way of background, large animals, such as watch dogs, cattle or bulls frequently have to be tethered by a rope or chain attached to its collar. Animals of the foregoing type are extremely strong and are capable of breaking their collars. Furthermore, animals, such as dogs, will apply jerking forces to their collars which may either break the collars or which may jar the buckles open.

SUMMARY OF THE INVENTION

It is one object of the present invention to provide an improved animal collar which is extremely strong and therefore is virtually incapable of being broken by a strong animal.

Another object of the present invention is to provide an improved animal collar which can be installed in the conventional manner by the use of a conventional buckle but which cannot be jarred open by jerking forces applied thereto. Other objects and attendant advantages of the present invention will readily be perceived hereafter.

The present invention relates to an animal collar comprising an inner elongated band of flexible leather-type material, an outer elongated band of flexible leather-type material in superposed relationship to said inner elongated band, a thin metal band sandwiched between said inner and outer elongated bands, first and second ends on said collar, a D-ring at said first end, said D-ring having an inner portion and an outer portion, said thin metal band passing around said inner portion of said D-ring and having an end portion in superposed relationship with an adjacent portion of said thin metal band, said outer portion of said D-ring extending outwardly beyond said thin metal band, a buckle located intermediate said first and second ends, said buckle comprising a loop-like member having an inner portion and an outer portion with a tongue pivotally mounted on said inner portion, said thin metal band and said outer elongated band being located on one side of said inner portion of said loop-like member and said inner elongated band being located on the opposite side of said inner portion of said loop-like member, first securing means securing said inner and outer elongated bands and said thin metal band to each other between said loop-like member and said D-ring, second securing means securing said inner and outer elongated bands and said thin metal band to each other on the opposite side of said loop-like member from said first rivet means, and a plurality of holes extending through said first and second elongated bands and said thin metal band at said second end for receiving said tongue. The various aspects of the present invention will be more fully understood when the following portions of the specification are read in conjunction with the accompanying drawings wherein:

BRIEF DESCRIPTION OF THE DRAWINGS

FIG. 1 is a fragmentary plan view of the improved animal collar;

FIG. 2 is a fragmentary cross sectional view taken substantially along line 2—2 of FIG. 1;

FIG. 3 is a cross sectional view taken substantially along line 3—3 of FIG. 1;

FIG. 4 is a cross sectional view taken substantially along line 4—4 of FIG. 1;

FIG. 5 is a fragmentary cross sectional view similar to FIG. 2 but showing the animal collar in buckled condition; and FIG. 6 is a fragmentary cross sectional view showing an alternate construction for mounting the buckle on the collar.

DESCRIPTION OF THE PREFERRED EMBODIMENTS

The improved animal collar 10 of the present invention includes an inner elongated band 11 of leather-type material, which includes leather, simulated leather, plastic and the like, an outer elongated band 12 of leather-type material and a thin metal band 13 sandwiched therebetween. Metal band 13 is preferably fabricated from stainless steel and is slightly narrower than elongated bands 11 and 12. Stitching 15 joins inner and outer bands 11 and 12, and it extends around the outer periphery of the collar as shown in FIG. 1. The inner and outer bands 11 and 12 are preferably formed of a single piece of leather-type material which is folded over on itself, as shown.

The collar 10 includes a tongue end 14 which is received in a buckle 16 as described hereafter. A D-ring 17 has an inner portion 19 and an outer portion 20 which receives the end 21 of a leash. D-ring 17 is a continuous member having no end portions. This provides strength against being pulled apart. The thin metal band 13 includes an end portion 22 which is located in encircling engagement with the inner portion 19 of the D-ring. In other words, the thin metal band 13 is continuous and extends around inner D-ring portion 19 at 22 and it has an end portion 23 which lies in contiguous relationship with the remainder of the metal band 13. Rivets 24 join the inner and outer bands 11 and 12 and the portions 18 and 23 of the thin metal band as shown in FIGS. 1 and 2 between the inner portion 19 of D-ring 17 and the inner portion 25 of buckle 16. This positively spaces the D-ring 17 from the inner portion 25 of loop-like buckle member 16.

The portion 23 of the metal band is continuous with and merges into portion 26 which underlies portion 27 of the thin metal band. The inner and outer elongated bands and the portions 26 and 27 of the thin metal band are secured to each other by rivets 29 which are located on the opposite side of inner portion 25 of the buckle from rivets 24. Thus, buckle portion 25 is firmly positioned between the rivets 24 and 29 closest thereto. The inner portion 25 of buckle 16 is continuous and the ends 30 of the loop-like member 16 are welded to each other at 31. A roller sleeve 32 is loosely mounted on portion 33 of loop-like member 16.

An elongated hole 34 is provided in upper elongated band 12 and elongated holes 35 are provided in the portions of the metal bands in the area of the inner end 36 of buckle tongue 37, the outer end 39 of which rests on roller sleeve 32. The inner end 36 of tongue 37 is formed into a loop 41 which loosely encircles inner portion 25 of loop-like member 16. The inner elongated band 11 is continuous and unperforated at 40 and it overlies the portion 36 of buckle tongue 37. The loop 41 is held against extensive movement along buckle portion 25 by crimped protrusions 42 (FIGS. 1 and 2) on buckle portion 25.

Holes 43 are formed in the tongue end 14 of the collar to receive the buckle tongue 37. Holes 43 extend entirely through the collar. Eyelets 44 have outer crimped portions 45 which are located on the outer surface 46 of elongated band 12 and they include inner crimped portions 48 which bear against the surface 47 of the metal band. Thus, eyelets 44 reinforce holes 43. The lower elongated band 11 covers crimped portions 46 so that they cannot catch the hair of the animal.

In FIG. 5 the collar is shown in its installed condition wherein buckle tongue 37 extends through one of the eyelets 44 and rests on sleeve 32. The free end or tongue end 14 proximate eyelets 44 passes through D-ring 17 (FIG. 5). Thus, when there is a stress placed on the D-ring, as by leash 21, inner portion 19 of the D-ring is restrained against movement in the direction 50 by the portion 22 of the metal band 13 which encircles D-ring portion 19 and the portion of metal band 13 which is sandwiched between elongated bands 11 and 12, as well as being held by loop 49 of the leather-type material at the end of the inner and outer elongated bands 11 and 12 and also by the elongated bands 11 and 12 which lie on opposite sides of metal band 13 at 51. The foregoing construction, when coupled with the fact that the D-ring is continuous, makes it virtually impossible for an animal to break the collar in the area of the D-ring 17. In addition to the foregoing, the portions 18 and 23 of the metal band, which are secured to each other by rivets between the D-ring 17 and the buckle 16, provide a rigid connection between D-ring 17 and buckle 16 so that forces applied to the D-ring will not be transmitted to the buckle 16, thereby preventing the buckle from being jerked open. Furthermore, the buckle 16 is held against being pulled outwardly from the remainder of the collar by the two layers of metal band which overlie it, as shown in FIGS. 2 and 5.

In FIG. 6 an alternate embodiment of the present invention is shown. This embodiment is identical in all respects to the embodiment of FIGS. 1–5 except for the orientation of the metal band in the vicinity of the inner portion 25 of the buckle. In this respect, the portions 18 and 27 of the metal band lie on one side of inner buckle portion 25 and the portions 23 and 26 of the metal band lie on the opposite side of buckle portion 25. Thus, metal band portions 23 and 26 reinforce the inner elongated band 11 and further aid in stabilizing inner buckle portion 25 against movement back and forth in the direction of arrows 53, thereby aiding in the prevention of the opening of buckle 16 due to jerking forces which may be applied to D-ring 17. In the embodiment of FIG. 6, the portion of the metal band between band portions 23 and 26 underlying loop 41 may be unperforated, inasmuch as the buckle tongue does not have to pass through it.

In FIGS. 1 and 2 a central portion of the collar 11 has been omitted for ease of illustration, and it will be appreciated that the collar in its entirety is sufficiently long so that it can encircle the neck of an animal. By way of general dimensions, however, buckle 16 may be spaced about three inches from D-ring 17, and the collar may be about one and three quarters inches wide. The foregoing are merely by way of example, and not of limitation, as the collar may have any suitable dimensions.

While preferred embodiments of the present invention have been disclosed, it will be appreciated that the present invention is not limited thereto but may be otherwise embodied within the scope of the following claims.

What is claimed is:
1. An animal collar comprising an inner elongated band of flexible leather-type material, an outer elongated band of flexible leather-type material in superposed relationship to said inner elongated band, a thin metal band sandwiched between said inner and outer elongated bands, first and second ends on said collar, a D-ring at said first end, said D-ring having an inner portion and an outer portion, said thin metal band passing around said inner portion of said D-ring and having an end portion in superposed relationship with an adjacent portion of said thin metal band, said outer portion of said D-ring extending outwardly beyond said thin metal band, buckle located intermediate said first and second ends, said buckle comprising a loop-like member having an inner portion and an outer portion with a tongue pivotally mounted on said inner portion, said thin metal band and said outer elongated band being located on one side of said inner portion of said loop-like member and said inner elongated band being located on the opposite side of said inner portion of said loop-like member, first securing means securing said inner and outer elongated bands and said thin metal band to each other between said loop-like member and said D-ring, second securing means securing said inner and outer elongated bands and said thin metal band to each other on the opposite side of said loop-like member from said first securing means, and a plurality of holes extending through said first and second elongated bands and said thin metal band at said second end for receiving said tongue.

2. An animal collar as set forth in claim 1 wherein said first and second securing means are rivets.

3. An animal collar as set forth in claim 2 wherein said end portion of said thin metal band is in contiguous relationship to said thin metal band and is secured by said first and second rivets and lies on the same side of said inner portion of said loop-like member as said thin metal band.

4. An animal collar as set forth in claim 2 wherein said end portion of said thin metal band is secured by said first and second rivets, and wherein the portion of said end portion of said thin metal band adjacent said inner portion of said loop-like member is located on the same side of said inner portion of said loop-like member as said inner elongated band.

5. An animal collar as set forth in claim 1 wherein eyelets are located at said holes, and wherein said eyelets have outer portions which extend through said outer elongated band and wherein said eyelets have inner portions which extend through said thin metal band, and wherein said inner portions of said eyelets are covered by said inner elongated band.

6. An animal collar as set forth in claim 1 wherein said inner and outer elongated bands comprise a single elongated band which is folded over on itself with the fold being located at said inner portion of said D-ring.

7. An animal collar as set forth in claim 1 wherein said thin metal band is of slightly less width than said inner and outer elongated bands, and stitching joining said inner and outer elongated bands about the outer periphery of said thin metal band.

8. An animal collar as set forth in claim 1 wherein said buckle includes a tongue having an inner end encircling said inner portion of said loop-like member, and wherein said metal band an said outer elongated band have openings therein to permit said tongue to pass therethrough.

9. An animal collar as set forth in claim 7 wherein said inner elongated band is continuous and unperforated proximate said inner end of said tongue.

* * * * *

UNITED STATES PATENT AND TRADEMARK OFFICE
CERTIFICATE OF CORRECTION

PATENT NO. : 4,491,090
DATED      : January 1, 1985
INVENTOR(S) : Anthony Almeida It is certified that error appears in the above–identified patent and that said Letters Patent are hereby corrected as shown below:

Column 4, line 13, (claim 1), before "buckle" insert --a--;
         line 62, (claim 8), change "an" to --and--.

Signed and Sealed this

Sixteenth Day of April 1985

[SEAL]

Attest:

DONALD J. QUIGG

*Attesting Officer*    *Acting Commissioner of Patents and Trademarks*